United States Patent [19]

Black et al.

[11] Patent Number: 5,288,052
[45] Date of Patent: Feb. 22, 1994

[54] SELF-DRAINING SANITARY CONTROL VALVE

[75] Inventors: W. Keith Black; Jerold L. Hlad, both of Salina; Phillip G. Rogers, Lorraine; Wayne A. Rohr, Kanopolis; Daniel L. Sharp; Bruce H. Shiffer, both of Ellsworth, all of Kans.

[73] Assignee: Cashco, Inc., Ellsworth, Kans.

[21] Appl. No.: 988,303

[22] Filed: Dec. 8, 1992

[51] Int. Cl.⁵ ............................................. F16K 31/28
[52] U.S. Cl. .................... 251/30.01; 137/556.3; 251/61.4; 251/291; 251/331
[58] Field of Search .................. 251/30.01, 61.4, 63.6, 251/291, 330, 331; 137/556.3

[56] References Cited

U.S. PATENT DOCUMENTS

| | | | |
|---|---|---|---|
| 1,585,732 | 5/1926 | Otto | 251/61.4 |
| 2,579,982 | 12/1951 | Trump | 251/331 X |
| 3,290,003 | 12/1966 | Kessler | 251/291 X |
| 3,689,025 | 9/1972 | Kiser | 251/61.4 X |
| 4,819,691 | 4/1989 | Lofgren | 251/331 X |
| 5,131,627 | 7/1992 | Kolenc | 251/331 |

FOREIGN PATENT DOCUMENTS

| | | | |
|---|---|---|---|
| 528948 | 6/1954 | Belgium | 251/61.4 |
| 376736 | 5/1964 | Switzerland | 251/61.4 |

*Primary Examiner*—Robert G. Nilson
*Attorney, Agent, or Firm*—Mason, Kolehmainen, Rathburn & Wyss

[57] ABSTRACT

The self-draining sanitary control valve includes a body having an inlet and an outlet and a fluid control port forming a valve seat between the inlet and the outlet. A bonnet is detachably secured to the body having a stem receiving bore aligned on a common central axis with the control port. Clamping rings are provided for securably clamping the body and bonnet together and for securing the valve body to adjacent fluid lines. The clamping rings are readily detachable for permitting the valve to be cleaned and the interior surfaces of the valve are closed to provide for self-draining of the fluid contained therein. The valve includes a stem slidably mounted in the bore with a valve plug at one end having a predetermined outer surface profile movable toward and away from the port and a flexible diaphragm is secured to a central portion of the plug for engaging the valve seat. An outer portion of the diaphragm is clamped between the body and the bonnet when the clamp ring is locked in place. A central portion of the flexible diaphragm is permanently secured to the profiled outer surface of the valve plug to provide a matching profile similar to the valve plug for cooperation with the valve seat to result in a predetermined flow characteristic that is dependent on the profile of the valve plug rather than the resilient characteristics of the diaphragm alone.

31 Claims, 7 Drawing Sheets

SELF-DRAINING SANITARY CONTROL VALVE

BACKGROUND OF THE INVENTION

1. Field of the Invention

The present invention relates to a new and improved self-draining sanitary control valve for use in sanitary fluid systems wherein cleanliness and sanitary conditions must prevail.

2. Background of the Prior Art

Control valves used in sanitary fluid systems have traditionally been of the diaphragm or plug type, which to a greater or lesser degree generally meet the requirements for cleanliness and sanitary conditions but which, inherently provide for poor flow control. The flow control characteristics of these valves is determined largely by the flexible nature of the diaphragm itself rather than by a preselected precision contour of a valve closure member. Some applications which have demanded more precise control have utilized plug valves which compromise cleanliness and sanitation conditions due to their complex internal contours and valve stem sealing means.

OBJECTS OF THE INVENTION

It is an object of the invention to provide a new and improved self-draining sanitary control valve which generally overcomes the lack of precision control characteristics and other shortcomings of prior art diaphragm and plug type valves.

Another object of the invention is to provide a new and improved valve having improved cleanliness and cleanability characteristics with respect to both inside surfaces and outside surfaces thereof.

It is an object of the present invention to provide a new and improved self-draining, sanitary control valve of the character described which has a highly polished and smooth interior surface with no crevices or cracks which tend to produce contamination or unsanitary deposits not easily removed.

Another object of the invention is to provide a valve having substantially all lower internal surfaces sloped in order to provide for self-draining characteristics.

Moreover, it is an object of the present invention to provide a new and improved self-draining sanitary control valve which is capable of being quickly and easily disassembled for inspection and cleaning, and which is capable of being cleaned by the circulation of sterilizing agents through internal passages in the valve.

Still another object of the present invention is to provide a new and improved self-draining sanitary control valve which has a precisely controllable flow characteristic determined by a preselected contour of a valve plug rather than by the flexibility characteristics of a diaphragm.

Another object of the present invention is to provide a new and improved self-draining sanitary control valve which can be quickly and easily disconnected from a fluid system and which includes a valve actuator for precision control of a flow controlling plug of the valve.

Another object of the present invention is to provide a new and improved self-draining sanitary control valve and an actuator therefor which may be rapidly and easily disconnected from one another at an outer end of a valve stem.

Still another object of the invention is to provide a new and improved valve actuator having a housing which is completely sealed to continuously maintain sanitary, self-draining "clean-in-place" pipe line system conditions within the actuator housing even when the valve stem of the associated valve is disconnected from the actuator.

Yet another object of the present invention is to provide a new and improved self-draining sanitary control valve and actuator combination which can be dropped out of a pipeline quickly and easily without the use of tools, and which can be rapidly and easily disassembled for cleaning and reassembly without requiring disconnection of any electric or pneumatic connections and without disturbing calibration of the unit.

Yet another object of the present invention is to provide a new and improved self-draining sanitary control valve and actuator combination which has an easily cleanable outer surface which can be washed down and wiped off without requiring a long drying period before sterile resumption of use of the system can occur.

Still another object of the present invention is to provide a new and improved self-draining sanitary control valve and actuator combination having a "quick disconnect" for rapid and easy disconnection and reconnection between an operator of the actuator and a valve stem of the valve.

BRIEF SUMMARY OF THE PRESENT INVENTION

In accordance with the foregoing and other objects of the present invention, a new and improved self-draining sanitary control valve is provided having a body formed with an inlet and outlet and a fluid flow control port therebetween providing a valve seat. A valve bonnet is detachably secured to the valve body and has a stem receiving bore aligned on a common central axis with the port and valve seat. All interior surfaces of the valve body and bonnet are highly polished, smooth and without crevices in order to facilitate sanitization thereof and lower portions of these internal surfaces are sloped to provide automatic self-draining. Detachable clamping rings are provided for securably clamping the valve body and the valve bonnet together and for securably clamping the valve body in a fluid flow line of a sanitary fluid system. The clamping rings can be opened and closed easily and rapidly so that the valve body and the valve bonnet may be uncoupled and reconnected and so that the valve body may be uncoupled and separated from the fluid flow line or sanitary piping system for disassembly, cleaning and reassembly in a rapid manner.

The valve includes a valve stem slidably disposed in the bore of the valve bonnet and having a valve plug at a lower end formed with a predetermined outer surface profile to provide a desirable flow control characteristic. The valve plug is movable toward and away from the valve seat in the valve body between a fully closed and a fully open position and when the plug is in an intermediate position, a predetermined flow characteristic obtains dependent upon the precise position of the valve stem within the bore. A flexible diaphragm has a central portion adjacent the valve plug which is positively secured to the profiled surface of the valve plug to provide a matching profile. This arrangement insures cooperation with the valve seat resulting in a specifically designed, predetermined flow characteristic dependent on the valve plug profile rather than a flow characteristic determined by the resiliency of the diaphragm alone. An outer portion of the flexible diaphragm is clamped between flanges on the valve body and valve bonnet and is held in sealed relationship by a clamping ring.

BRIEF DESCRIPTION OF THE DRAWINGS

For a better understanding of the present invention, reference should be had to the following detailed description taken in conjunction with the drawings, in which.

DETAILED DESCRIPTION OF A PREFERRED EMBODIMENT OF THE INVENTION

Figure 1:
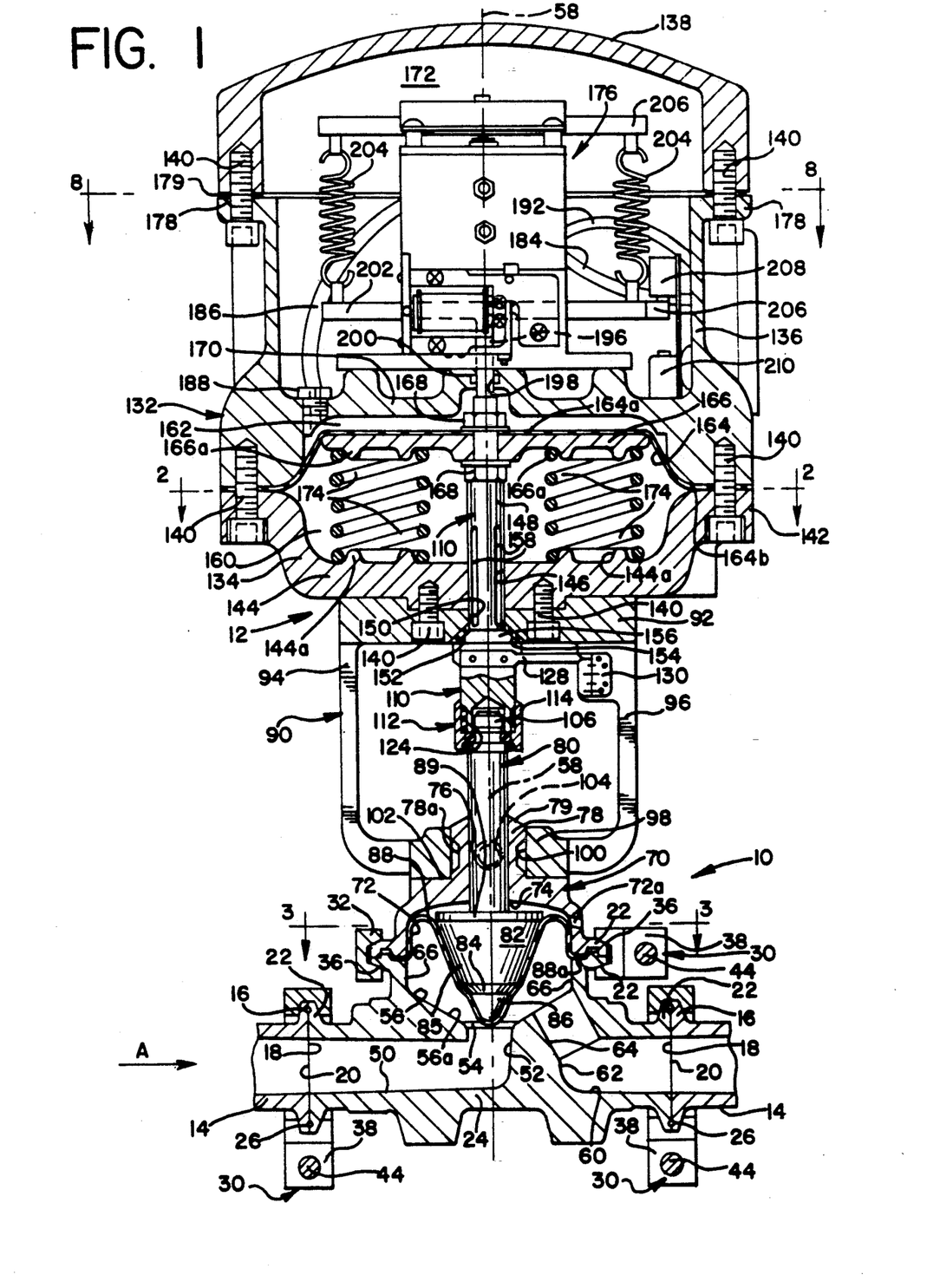
FIG. 1 is a cross-sectional view of a new and improved self-draining sanitary control valve and actuator therefor constructed in accordance with the features of the present invention.

Referring now more particularly to the drawings, therein is illustrated and new and improved self-draining globe type sanitary control valve and actuator therefor, respectively, referred to in the drawings by the reference numerals 10 and 12 (FIG. 1). The self-draining sanitary control valve 10 is adapted for use in sanitary fluid systems commonly used in pharmaceutical and other processes employing sanitary fluid lines with flow conduits 14 having radial end flanges 16 having planar end faces 18. As will be described briefly in connection with the valve of FIGS. 9 and 10, weldable type end flanges can also be provided to secure the valve in place in the tubing system where removal of the valve body is not required. The end faces 18 are dimensioned to confront similarly dimensioned planar end faces 20 provided on radial end flanges 22 formed in coaxial alignment at opposite ends of a unitary valve body 24 of the self-draining, sanitary control valve 10. Gaskets 26 with beads on each face (FIG. 1) are provided in confronting grooves 28 of each pair of abutting end faces is and 20 to provide a fluid tight seal when the valve body 24 is coupled into place as shown in FIG. 1.

In accordance with the present invention, the self-draining control valve 10 may be rapidly disconnected, decoupled and dropped out of a fluid system and the flow conduits 14 thereof by utilizing a pair of quick-couple and quick-disconnect clamping ring assemblies 30 (FIG. 3) such as those sold under the trademark "TRI-CLAMP" and manufactured by Tri Clover, Inc. of Kenosha, Wis. Briefly referring to FIG. 3, each clamping ring assembly 30 includes a pair of arcuate side sections 32 having a tapered arcuate internal groove 34 with a wedge-shaped transverse cross-section having opposed beveled faces adapted to bear against beveled back side surfaces 36 of the respective end flanges 16 and 22 of the fluid conduits 14 and the valve body 24, respectively.

Figure 3:
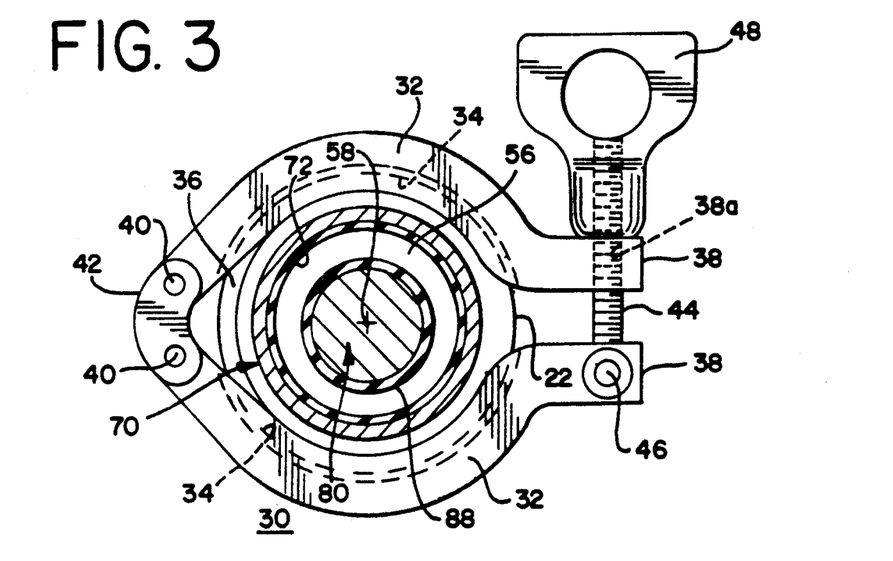
FIG. 3 is a transverse cross-sectional view taken substantially along lines 3—3 of FIG. 1.

Each clamping ring assembly 30 includes a pair of side members 32 which are pivotally interconnected by a pair of pivot pins 40 and a short, link member 42 (FIG. 3). At the opposite end, each side member 32 includes an outwardly extending leg 38 and when the clamping ring is coupled to a closed position for locking pairs of abutting flanges together as shown in FIGS. 1 and 3, the legs 38 on opposite side members 32 are parallel to one another and are mechanically interconnected by a threaded element 44 having one end pivotally secured to a pivot pin 46 journalled in one of the legs 38 and an opposite end projecting through a bore 38a in an opposite leg 38. A thumb screw 48 used for tightly securing the clamping ring assembly 30 in a coupling condition for securely holding a pair of abutting end flanges 16 and 22 clampled together in a tightly sealed concentric, confronting relationship.

It is thus seen that each clamping ring assembly 30 may be rapidly removed so that the valve body 24 can be dropped out of the fluid system between the end flanges 16 of the flow conduits 14 and then can be rapidly reassembled into the system by easy and quick positioning of the side members 32 on the abutting flanges tightening of the thumb screws 48. The valve body 24 also includes a horizontally extending radial flange 22 positioned midway between and at a level above the opposite end flanges 22. The horizontal flange 22 has an upwardly facing, modified planar end face 20a (FIG. 4).

Figure 4:
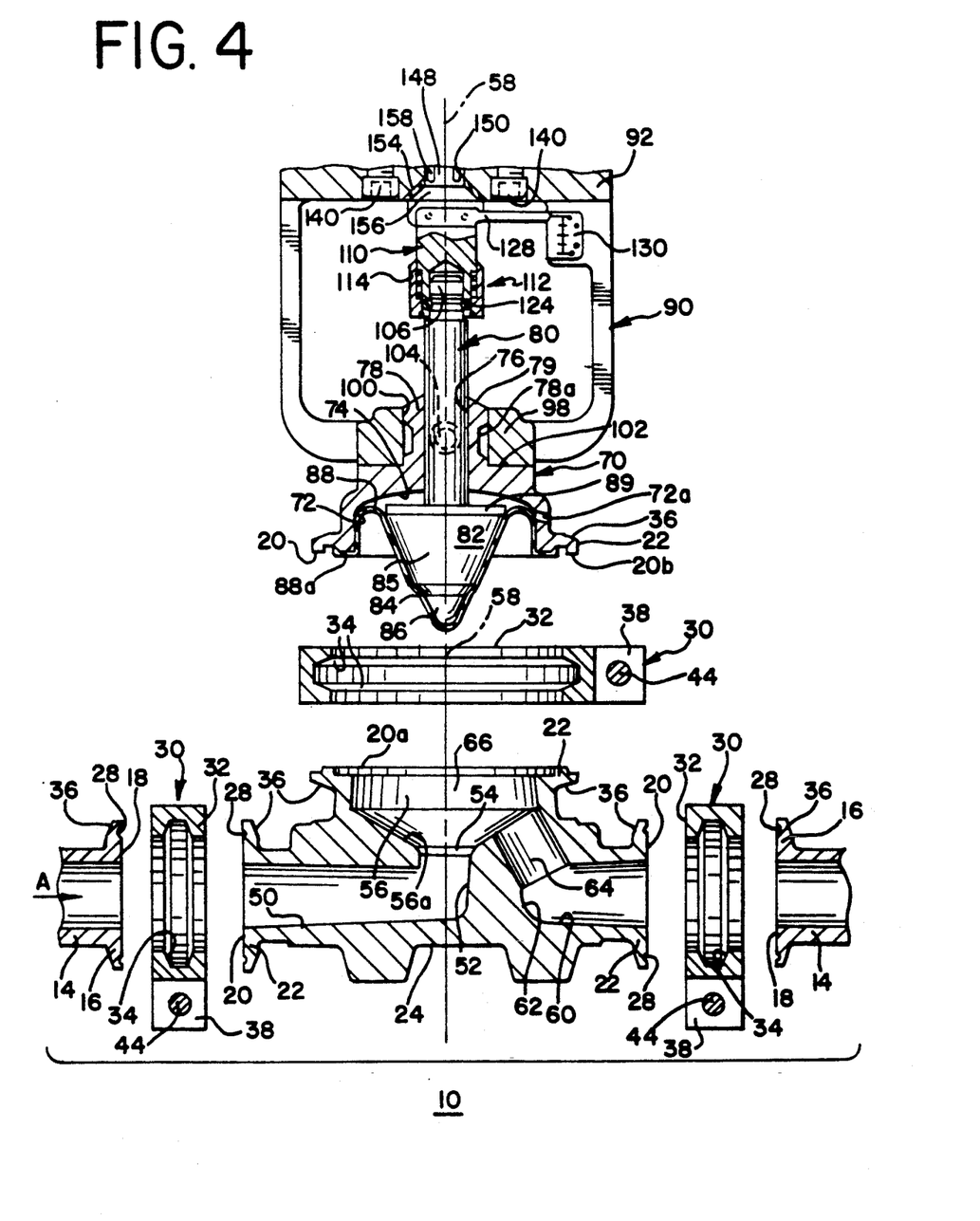
FIG. 4 is an exploded perspective view illustrating the sanitary control valve in a partially disassembled condition wherein the valve body is separated from the valve bonnet and from the fluid flow lines in a sanitary fluid system.

Referring to FIGS. 1 and 4, and assuming fluid flow through the conduits 14 to move from left to right as indicated by arrow A, the left hand end flange 22 surrounds and is in concentric alignment with an inlet passage 50 of generally frustoconical shape providing an outwardly and downwardly directed sloping lower surface which is highly polished so as to be self-draining of any liquid remaining in the interior passage 50 when the valve body 20 is dropped out of the fluid system as shown in FIG. 4. The inlet passage 50 terminates at an inner end portion 52 and fluid flow reaching the inner end portion is then directed upwardly toward a centrally located frustoconical valve seat 54 forming a flow port or passageway to provide precise flow control between the inner end portion 52 of the inlet passage 50 and a lower end portion of a generally cylindrical main valve chamber 56. The valve chamber 56 is aligned in concentric coaxial alignment with the upper horizontal end flange 22 on a common central axis 58 spaced midway between opposite vertical end faces 20 of the valve body 24.

The valve body 24 also includes a generally frustoconical outlet passage 60 having a downwardly and outwardly sloping lower surface designed to provide self-draining characteristics and having an outer end or outlet in coaxial alignment with the face 20 of the radial end flange 22 at the right hand end of the valve body 24 shown in FIG. 1. The outlet passage 60 has an inlet end portion 62 in communication with the lower end of an upwardly extending inwardly sloped passageway 64 (FIG. 1). The passage 64 has an upper end in communication with a generally frustoconically-shaped lower end surface 56a of the cylindrical valve chamber 56. All of the internal fluid contacting surfaces in the valve body 24 including the inlet passage 50, the valve seat 54, the valve chamber 56, the outlet passage 60 and the sloped passage 64 are highly polished, with mirror-like surfaces and without crevices or cracks so as to be easily sanitized.

Moreover, all internal passages or chambers are either vertically aligned or have downwardly sloping surfaces to provide for automatic self-draining. These wall surfaces are smooth and highly polished and are formed without niches, crevices or grooves in which contaminating materials and/or fluids may easily accumulate. Preferably, the valve body is formed of metal such as stainless steel or other hard surface materials including plastic resins which are capable of providing a high-gloss, polished surface without pores, cracks or crevices in order to insure excellent self-draining characteristics so that rapid sanitation may be easily completed.

In accordance with the invention, the valve chamber 56 has a generally cylindrical, upstanding side wall surface 66 that terminates at the horizontal upper end face 20a of the horizontally extending upper radial flange 22. An upper portion of the valve chamber 56 is formed by a valve bonnet 70 of generally inverted cup-shape configuration having a horizontally extending radial flange 22 at a lower end with a lower end face 20b (FIG. 4) adapted to confront the upwardly facing end face 20a of the horizontal flange 22 on the lower valve body 24.

Figure 6:
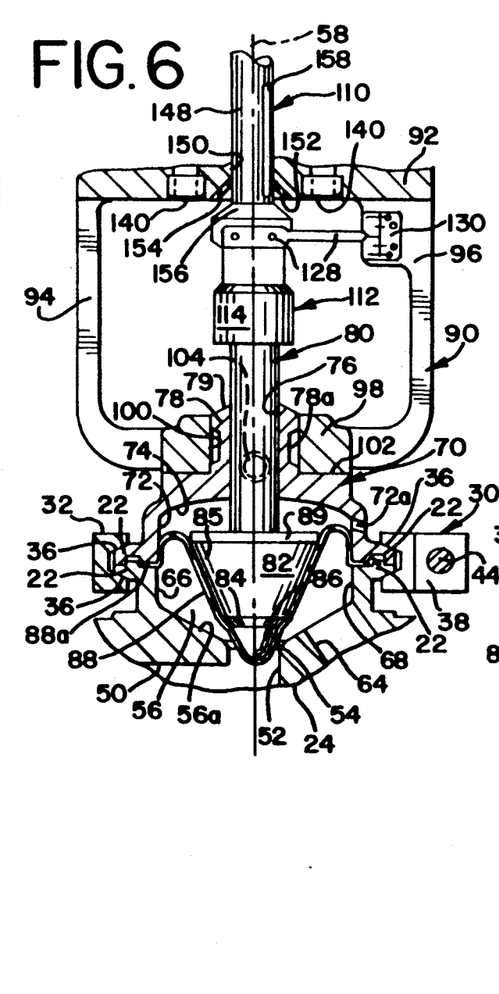
FIG. 6 is a fragmentary cross-sectional view showing a portion of the valve body and valve bonnet connected to the valve actuator with the valve plug shown in a partially open condition.
Figure 7:
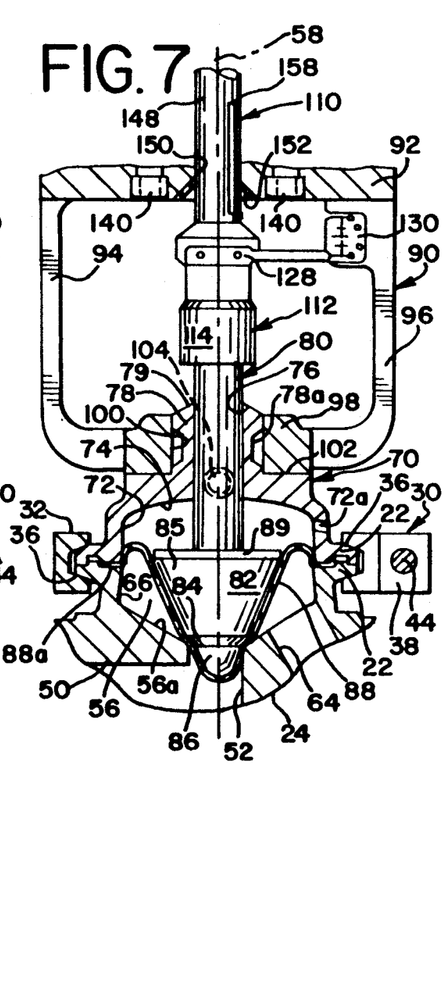
FIG. 7 is a fragmentary cross-sectional view similar to FIG. 6 but showing the valve plug in a fully closed position.

The valve bonnet 70 includes a generally cylindrical upstanding side wall 72 projecting upwardly of the surface 20b and terminating in a dome-shaped internal surface or top wall 74 forming the upper end of the valve chamber 56. The upper end wall 74 of the bonnet 70 is provided with a bore 76 in coaxial alignment with the common axis 58 and the bore projects upwardly within an upstanding generally cylindrical boss 78 extending upwardly from the upper end wall of the valve chamber 56. In accordance with the invention, a valve stem 80 of cylindrical shape is slidably disposed in the bore 76 of the upstanding boss 78 of the valve bonnet 70. A generally frustoconically-shaped valve plug 82 is secured to the lower end of the valve stem 80 and at a mid-level on the plug 82 there is provided a frustoconical-shaped, annular seating surface 84 designed and dimensioned to confront the fixed, frustoconical valve seating surface 54 in the main valve body 24 when the valve is in a closed position as shown in FIG. 7. Beneath the level of the annular seating surface 84, the valve plug 82 is provided with a precisely machined profiled lower end segment 86 and the shape or contour of the profile of this segment determines the operating flow characteristics of the valve after the valve plug 82 is cracked open and moved upwardly from the position of FIG. 7 through intermediate positions (FIG. 6) up to a full open position as shown in FIG. 1.

In accordance with an important feature of the present invention, the self-draining control valve 10 is provided with a flexible valve diaphragm 88 having a central segment that is adhesively cemented or otherwise fixedly secured to the outer surface of the lower end segment 86 and seating surface 84 of the valve plug 82 and also is secured to an upwardly extending frustoconical valve plug surface 85 above the level of the seating surface 84. Because the flexible diaphragm 88 is positively secured to substantially the entire outer surface of the valve plug 82 below an upper end portion 89 thereof, the flow control characteristics of the valve 10 are determined by the precise contour or profile of the lower end segment 86 of the valve plug 82 rather than by the physical flexing characteristics of the flexible diaphragm 88.

The underside or lower surface of the flexible diaphragm 88 closely and precisely matches the contour of the profile of the lower end surface of the valve plug 82 below the seating surface 84 so that the flow control characteristics are positively determined by the shape of the valve plug end segment 86 rather than the flexibility, thickness or type of material used for the flexible diaphragm 88. The diaphragm 88 includes a marginal annular outer edge portion 88a which is sandwiched between the flange faces 20a and 20b of the main valve body 24 and the bonnet 70; and thus, the annular outer edge portion 88a of the flexible diaphragm 88 serves as a seal and a divider between the bonnet 70 and main valve body 24 and separates the valve chamber 56 into upper and lower portions which are positively closed off and sealed from one another. The horizontal clamping ring assembly 30 permits rapid disconnection and reconnection between the valve bonnet 70 and the main valve body 24 so that the main valve body 24 can be dropped out of the fluid system so that the underside of the diaphragm 88 may be exposed for cleaning and sanitation. The side wall 72 of the upper portion of the valve chamber 56 is provided with a vent opening 72a in order to maintain the portion of the valve chamber above the flexible diaphragm 88 at an atmospheric operating pressure during reciprocal movement of the valve plug 82 and valve stem 80 along the vertical axis 58.

In accordance with the present invention, the sanitary self-draining control valve 10 is mechanically interconnected with the valve actuator 12 by means of a connector 90 symmetrically disposed about the valve stem central axis 58. The connector 90 includes a generally cylindrical upper attachment plate 92 having a pair of downwardly extending, vertical legs 94 and 96 disposed on opposite sides and parallel of the valve stem 80 and the common central axis 58. The legs provide support for an integrally formed, circular mounting ring 98 at the lower end of the connector 90 having a bore 100 adapted to receive an upper end portion of the upstanding boss 78 of the valve bonnet 70. The circular mounting ring 98 is generally parallel of the upper plate 92 and the bore 100 is in coaxial alignment with the central vertical stem axis 58. The legs 94 and 96 are integrally joined at the upper ends with the upper plate 92 and at the lower ends, the legs extend radially inwardly and are integrally joined with the outside edge surface of the lower mounting ring 98 at diametrically opposed positions thereon.

The lower mounting ring 98 is adapted to seat on a shouldered recess 102 formed on the outside surface of the bonnet 70 around the upstanding boss 78. The mounting ring 98 has a flat lower face designed to precisely fit against a flat annular upper face of the shoulder 102 around the boss 78 of the valve bonnet 70. The outer diameter of the upwardly projecting boss 78 is precisely machined to match the internal diameter of the bore 100 in the mounting ring 98 so that precise coaxial alignment between the valve 10 and the actuator 12 along the common stem axis 58 is obtained. The boss 78 has a frustoconical upper end surface 79 sloping downwardly and outwardly toward the adjacent upper surface of the mounting ring 98 to provide for self-draining of liquid away from the valve stem 80.

As illustrated best in FIG. 4, the outer, generally cylindrical side face of the upstanding boss 78 of the bonnet 70 is formed with an annular groove 78a at mid-level thereon and the groove is designed to accommodate a radial set screw 104 extending inwardly in a threaded bore provided in the ring 98 so that a desired relative rotational position between the support structure 90 and the valve 10 can be attained and then locked in place by tightening of the set screw 104.

In accordance with the present invention, an upper end portion 106 of the valve stem 80 is machined with a reduced diameter section having an annular groove 108 formed at mid-level therein in order to provide for rapid interconnection and disconnection with a reciprocally movable operator stem 110 of the valve actuator 12.

Figure 5:
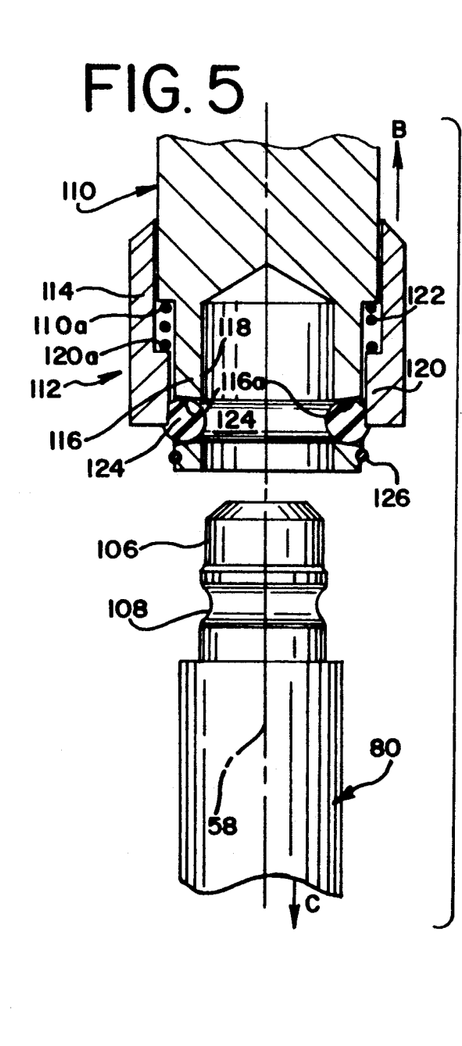
FIG. 5 is an enlarged fragmentary cross-sectional view illustrating a quick-disconnect for rapidly detaching the valve stem of the sanitary control valve from an actuating element or operation of the valve actuator.

The reduced diameter of the upper end portion 106 of the valve stem 80 and the lower end portion of the operator 110 of the actuator 12 are rapidly disconnected and reconnected by means of a quick-disconnect assembly 112 of a type commonly used for air hoses, hydraulic lines, and the like. The quick-disconnect assembly 112 is best shown in FIG. 5 and includes a hollow, cylindrical sleeve 114 slidably disposed on the lower end portion of the operator stem 110 having a reduced diameter end segment 116 formed with a counterbore 118 terminating in a blind upper end. A lower end rim portion 120 having a thicker wall is provided on the manually movable sleeve 112 so that a coil spring 122 can be positioned on the end segment 116 between opposing annular faces 110a and 120a on the operator stem 110 and sleeve 112, respectively, to exert a downward bias on the sleeve.

A resilient lock ring 124 is mounted on the outer surface of the lower end segment 116 of the operator stem 110 and seats in a plurality of slots 116a formed in the wall of the reduced diameter end segment 116. When the sleeve 112 is manually moved upwardly on the stem 110 against the bias of the spring 122 (arrow B—FIG. 5), the inside surface of the thick wall section 120 permits the lock ring 124 to expand radially outwardly of the groove 108 in the upper end portion 106 of the valve stem 80 and the valve stem may then be disconnected by downward travel (arrow B—FIG. 5), relative to the operator stem 110. Reconnection is achieved by retaining the sleeve 112 in an upper position on the stem 110 as shown, reinserting the upper end portion 106 of the valve stem 80 upwardly into the counter bore 118, and then releasing the sleeve 112 to move downwardly on the operator stem 110 under the bias of the spring 122. As the latter action takes place, the thick wall portion 120 on the sleeve 112 cams the lock ring 124 inwardly into the groove 108 to positively lock together the operator stem 110 and valve stem 80 to move in unison.

In order to provide a visual determination of the precise position of the valve plug 82 within the valve body 24, the operator stem 110 is provided with a pointer 128 secured thereto and having a pointed outer end movable up and down with respect to a fixed scale indicator 130 mounted on the right hand leg 196 of the connector 90. When the sanitary, self-draining flow control valve 10 is closed as illustrated in FIG. 7, the end of the pointer 128 is positioned at the lower end of the scale 130 and an appropriate mark designated as a "closed" position is provided on the scale. Similarly, when the valve 10 is partially opened as shown in FIG. 6, the pointer 128 moves upwardly relative to the scale 130 to a mid-level marking and when the valve 10 is fully open as shown in FIG. 1, the pointer 128 is positioned adjacent the upper end wherein a fully "open" mark is provided on the scale 130.

Figure 2:
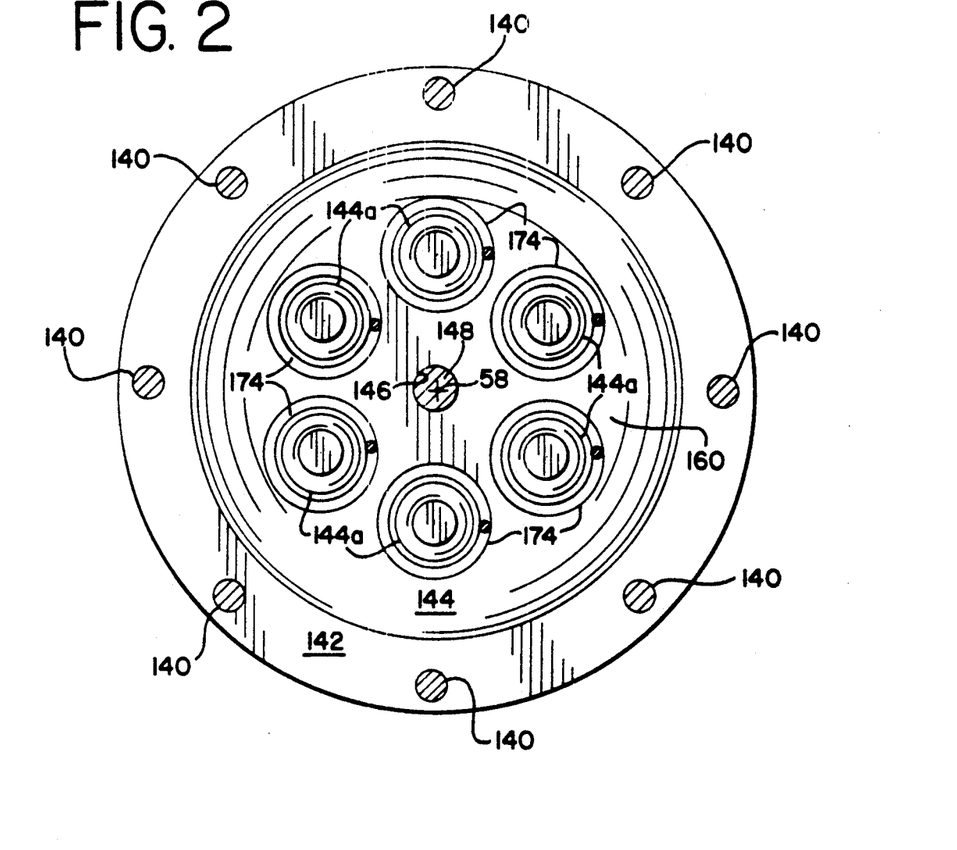
FIG. 2 is a transverse cross-sectional view taken substantially along lines 2—2 of FIG. 1.
Figure 8:
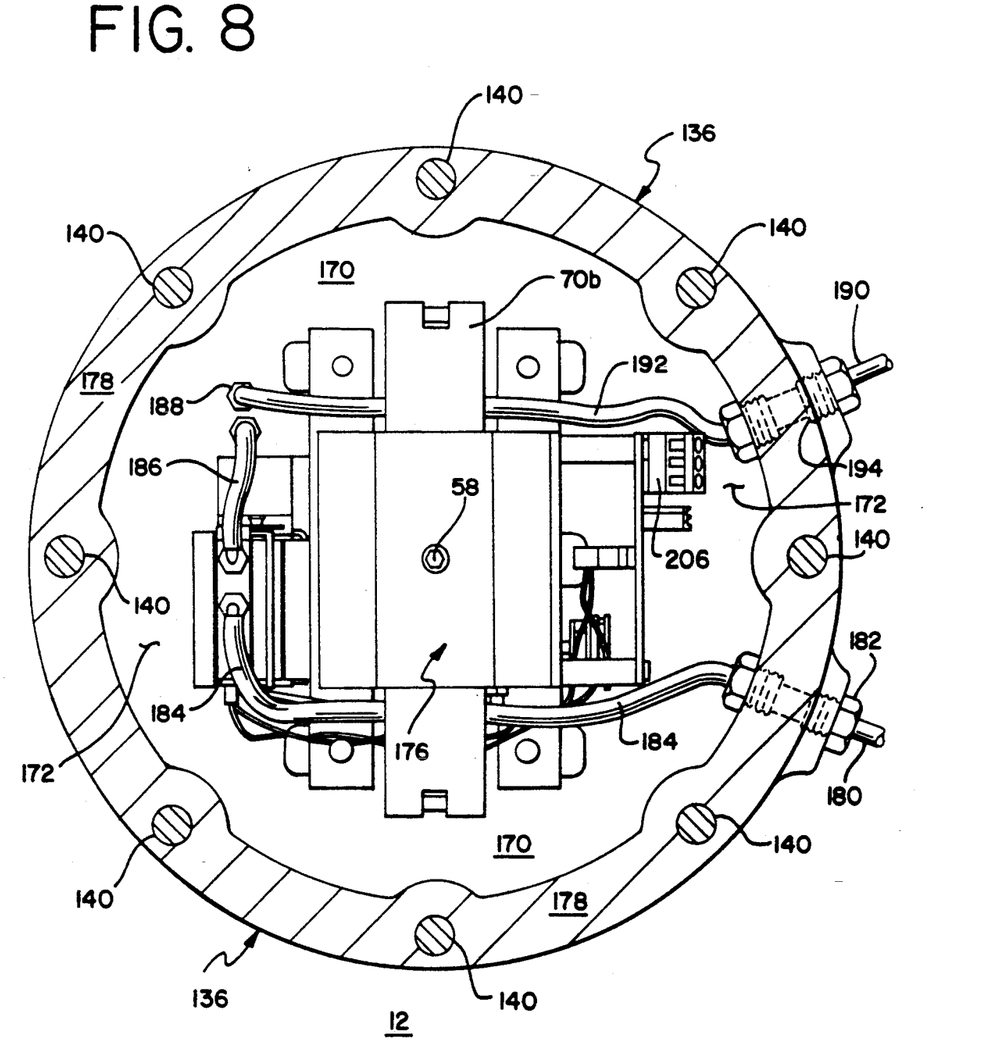
FIG. 8 is a transverse cross-sectional view of the valve actuator taken substantially along lines 8—8 of FIG. 1.

The valve actuator 12 includes a generally cylindrical-shaped, sealed housing 132 preferably formed of metal having a highly polished, smooth, crevice-free outer surface to provide excellent self-draining characteristics for rapid sanitary cleaning of the outside surface. The actuator housing 132 includes a piepan-shaped lower end wall 134, a generally cylindrical, intermediate side wall or body 136 and a dome-shaped top wall or cap 138. These wall components are assembled together in coaxial alignment on the axis 58 and are detachably secured to one another by a plurality of circumferentially spaced apart, upwardly extending threaded cap screws 140 having threaded shanks projecting upwardly from cylindrical heads and having a socket wrench receiving recesses in the heads facing downwardly as illustrated in FIGS. 1 and 4. As indicated in FIGS. 2 and 8, the cap screws 140 are equilaterally spaced around the circumference of the respective segments of the housing 132 and because socket type heads of the set screws 140 are on the lower end, there is little tendency for liquid or other contaminants to become entrapped or retained in the vicinity of the cap screw heads.

Referring more specifically to FIG. 1, the lower end wall 134 of the housing 132 of piepan-shaped configuration employs an upper, outwardly extending radial flange 142 having a horizontal, planar upper face and a parallel, annular lower face formed with cylindrical openings for receiving the heads of the upwardly projecting cap screws 140. The lower end wall 134 also includes a smaller diameter circular, bottom wall 144 having a centrally positioned bore 146 in coaxial alignment on the stem axis 58 to reciprocally receive an intermediate, main body portion 148 of the operator stem 110 disposed for vertical sliding movement therein.

As previously indicated, the circular upper plate 92 is secured to the underside of the bottom wall 144, also by means of a plurality of upwardly extending, socket head cap screws 140 and the circular plate 92 is formed with a central bore 150 coaxially aligned with the bore 146 adapted to slidably receive the intermediate portion 148 of the operator stem 110. The lower end portion of the bore 150 is formed with a frustoconical segment 152 and a frustoconically-shaped, resilient sealing ring 154 is mounted on the surface of the bore segment 152 adapted for sealing engagement with a matching, annular frustoconically-shaped shoulder portion 156 formed on the upper end of the lower portion of the operator stem 110 at a level below the intermediate portion 148 thereof. A seal between the bore 150 and the operator stem 110 may also comprise only an "O" ring mounted appropriately on the stem or in the bore.

As illustrated in FIGS. 1 and 4, when the valve 10 is in a fully open position and/or when the valve body 24 has been dropped out from the fluid lines 14 and the operator stem 110 is in a fully retracted upward position, the seating surface 156 on the operator stem 110 presses into sealing contact with the resilient frustoconical seal 154 on the flared frustoconical lower end portion 152 of the bore 150 in the circular plate 92 to thereby provide a positive seal between the circular plate 92 around the operator stem 110. The operator stem 110 may be formed with one or more elongated grooves 158 along a lower end portion thereof extending longitudinally of the stem axis 58 and these grooves permit the passage of air to and from the housing 132 when the operator stem 110 is in an extended or open position as shown in FIG. 6 or a valve closed position of FIG. 7. Venting of air may also be permitted by the adoption of suitable clearances between the stem 110 and bore 150.

The lower end portion of the actuator housing 132 is divided into a lower, spring chamber 160 and an upper, fluid chamber 162 by means of a flexible diaphragm 164 secured to the upper side of a piston element 166 mounted on the operator stem 110 and secured in place thereon by a pair of nuts and washers 168 as shown in FIG. 1. A central portion 164a of the diaphragm 164 may be adhesively or otherwise secured to the upper surface of the piston 166 and an outer marginal edge portion 164b of the diaphragm is secured between confronting faces of the flange 142 on the lower wall member 134 and a lower outer end face of the intermediate, cylindrical side wall section 136, thus providing a positive fluid tight seal between the lower spring chamber 160 and upper fluid chamber 162.

The intermediate, cylindrical side wall section 136 of the housing 132 includes an integrally formed, horizontal bottom wall 170 which forms the bottom wall of an upper control chamber 172 spaced above the fluid chamber 162. The piston 166 is biased upwardly of the circular bottom wall 144 towards the wall 170 of the intermediate cylindrical wall section 136 by means of a plurality of individual, vertically disposed coil springs 174 which are equilaterally disposed in a symmetrical pattern and spaced radially outwardly around the central stem axis 58. The coil springs 174 are chosen with a preselected spring constant to provide the desired operating parameter of the valve actuator 12. The upper and lower ends of the springs 174 are retained in coaxial alignment by means of circular ring bosses 166a and 144a formed on the upper and lower faces, respectively, of the piston 166 and the bottom wall 144.

From the foregoing, it will be seen that whenever the operator stem 110 is in an upward inwardly retracted position as shown in FIGS. 1 and 4, the lower fluid chamber 160 is closed off against the ingress of air or other contaminants from the outside by means of the frustoconical seal 154 or an "O" ring around the lower portion of the operator stem 110. This prevents contamination of the fluid chamber 160 with externally applied wash water or the like. When the valve 10 is operating, the lower fluid chamber 160 is vented to the atmosphere and maintained at atmospheric pressure by means of the elongated grooves or flutes 158 provided in a lower portion of the intermediate segment 148 of the operator stem 110. The upper fluid chamber 162 is thus acting only against the bias of the springs 174 and the prevailing atmospheric pressure rather than a back pressure which would prevail if the lower spring chamber 160 was completely sealed from the atmosphere during valve operation.

In accordance with the present invention, the control chamber 172 in the upper portion of the actuator housing 132 provides a sealed enclosure for an electro-fluidic positioner 176 adapted to supply controlled fluid pressure to the fluid chamber 162 for precisely controlling positions of the actuator stem 110. The intermediate housing member 136 is provided with a horizontal radially outwardly extending flange 178 and an annular sealing gasket of resilient material 179 is disposed between the upper surface of the flange 178 and the lower end face of the housing top cover 132. Preferably, the electro-fluidic positioner 176 is of a type manufactured by the Bellofram Corporation of Newell, W. Va. and these positioners include a current-to-pressure transducer generally of a type shown in U.S. Pat. Nos. 4,729,398 or 4,905,702, which patents are incorporated herein by reference. In general, an electrical signal is utilized to control the pressure of operating fluid such as compressed air supplied to the fluid chamber 162 to control movement of the piston 166 and diaphragm 164 which, in turn, move the actuator stem 110 and connected valve stem 80 to control the flow of fluid through the sanitary control valve 10.

Referring specifically to FIGS. 1 and 8, pressurized fluid from an external source such as an air compressor or manifold system is supplied to the positioner 176 from a pressure supply line 180 connected to a coupling assembly 182 mounted in the side wall of the intermediate wall section 136. The coupling 182 is connected at its inner end to an internal fluid supply conduit 184 for supplying a source of pressurized operating fluid to the positioner 176. Dependent upon the electrical signal received by the positioner 176, the output pressure of fluid for control of the valve actuator 12 is determined and control fluid at appropriate pressure is supplied via a conduit 186 connected to a fitting 188 provided in the wall 170 to introduce control pressure fluid into the fluid chamber 162 for moving the piston 166 and diaphragm 164 against the force of the bias springs 174 to a desired position to control the valve 10. Exhaust fluid from the fluid chamber 162 is directed to an external exhaust line 190 via an internal exhaust line 192 and a sealed coupling assembly 194 mounted in the side wall of the intermediate chamber section 136. Thus, both of the supply fluid and exhaust fluid lines are completely sealed for operating the valve actuator 12 and without external contamination resulting from the exhaust fluid released to the atmosphere around the valve actuator 12.

In accordance with the present invention, feedback position information in the form of a mechanical position of the operator stem 110 is provided as an input to the electro-fluidic positioner 176 by means of a positioning stem 196 projecting upwardly from the piston 166 through an opening or bore 198 at the center of the bottom wall 170 of the control chamber 172. A sealing ring 200 is provided for sealing around the positioning stem 196 so that pressure loss from the fluid chamber 162 does not occur. At the upper end, the positioning stem 196 is connected to a cross member 202 biased upwardly by a pair of tension springs 204 supported from a fixed cross member 206 at the upper end of a body portion of the electro-pneumatic positioner 176. The movable cross member 202 has an outer end portion 206 adapted to move between upper and lower limit switches 208 and 210 (FIG. 1) which provide limit control for the electro-fluidic positioner 176 based on feedback supplied to indicate the precise position of the operator stem 110.

It will thus be seen that the electro-fluidic positioner 176 provides pressurized fluid for operating the valve actuator 12 to precise control characteristics and the control fluid supplied to and exhausted from the chamber 136 of the housing 132 utilized by the electro-fluidic positioner 176 is separated completely from the surrounding atmosphere, thus making sanitation and cleaning of the external surfaces of the actuator relatively easy and rapid. Moreover, the electro-fluidic positioner 176 is supplied with mechanical position feedback relative to the operating stem 110 and the control chamber 172 provides a sealed environment for enclosing electrical limit switches 208 and 210 which are utilized to aid in the control and operation of the electro-fluidic positioner.

Figure 9:
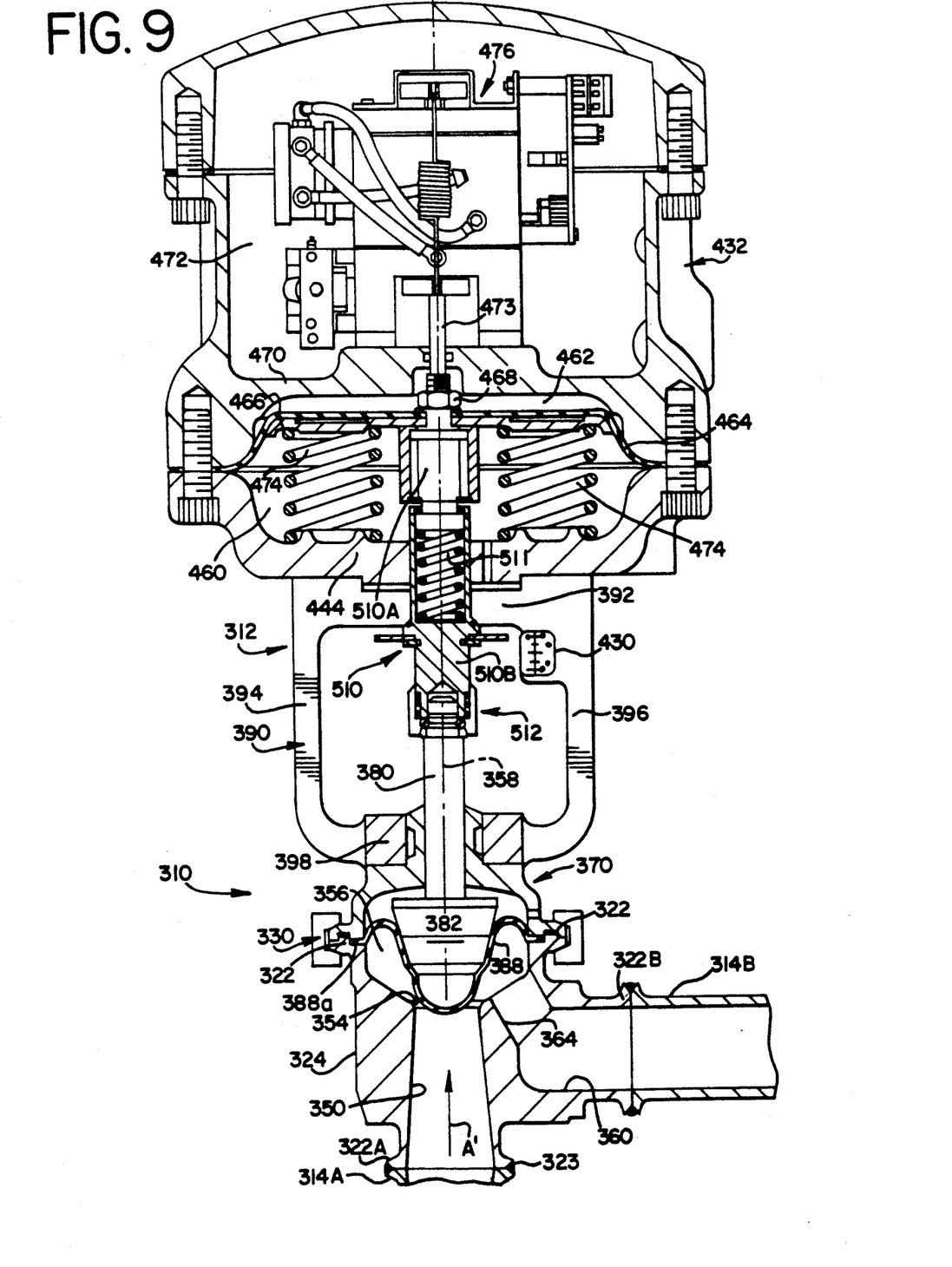
FIG. 9 is a cross-sectional view of another embodiment of a new and improved self-draining sanitary control valve and actuator therefor, constructed in accordance with the features of the present invention.
Figure 10:
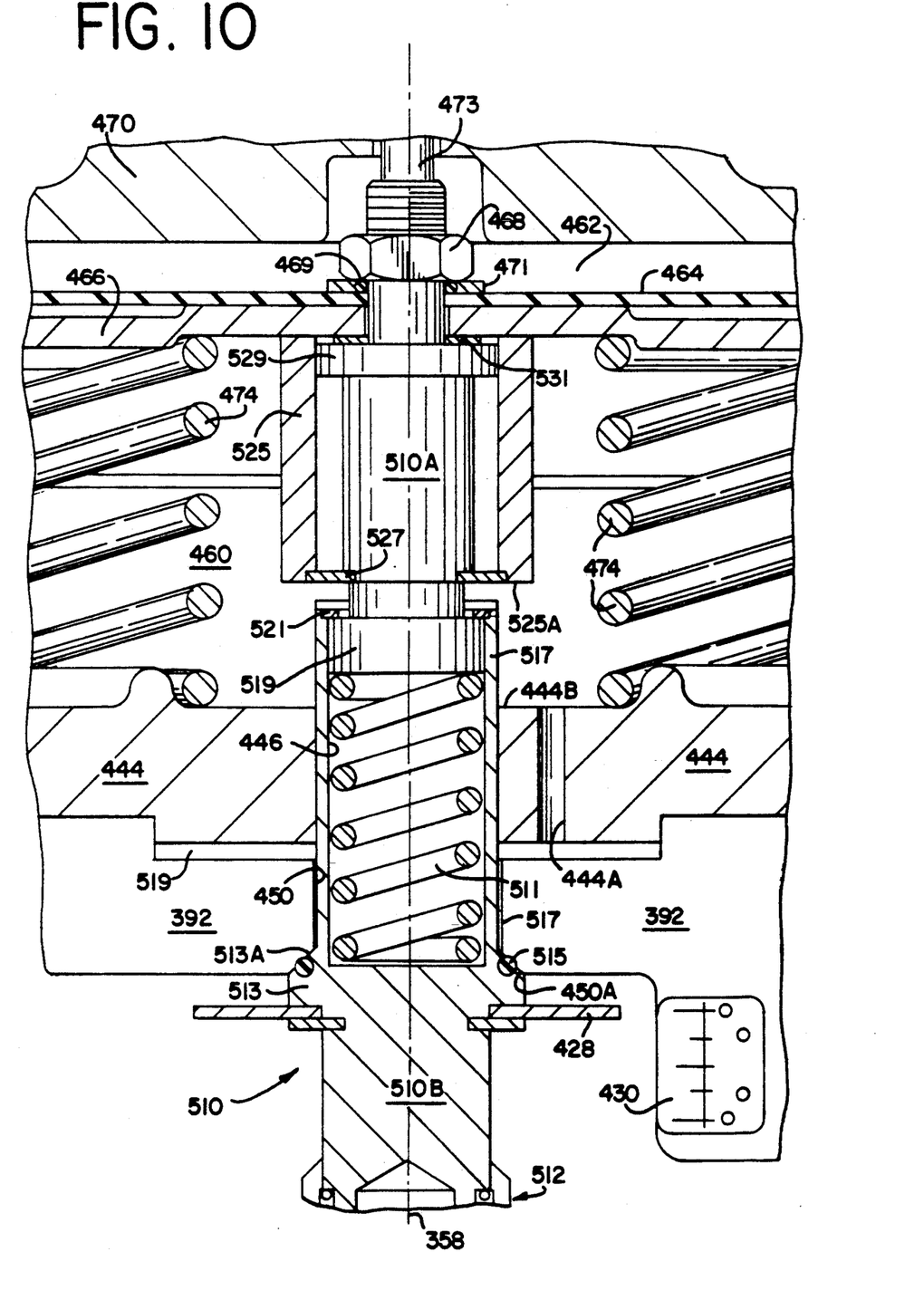
FIG. 10 is an enlarged fragmentary cross-section illustrating an overload protection system for the valve of FIG. 9.

Referring now to FIGS. 9 and 10, therein is illustrated another embodiment of a self-draining sanitary control valve 310 and actuator therefor 312 constructed in accordance with the features of the present invention. Because the valve 310 and actuator 312 are generally similar to the valve 10 and actuator 12 previously described herein, only the differences will be described in detail.

The valve 310 is an angle type valve adapted to receive a flow of fluid in a direction A' coaxially aligned with a valve stem axis 358 from an inlet line 314A and direct a controlled flow of fluid outwardly into a fluid line 314B at right angles or 90° to the inlet line rather than coaxial therewith. The valve 310 includes a valve body 324 having an inlet passage 350 formed with a welding flange 322A at the lower end adapted to be joined permanently to a similar flange of the inlet line 314A by welding 323. Similarly, the valve body 324 includes an outlet passage 360 having a welding flange 322B at the outer end adapted to be permanently joined to a similar flange on the outlet line 314B by welding 323. The valve body 324 is thus permanently secured in the pipeline and does not drop out as in the prior embodiment.

The valve 310 includes a valve chamber 356 and sloped passage 364 communicating between the inlet passage 350 and outlet passage 360 and fluid control is provided by a valve plug 382 mounted on a valve stem 380 movable along the common axis 358 toward and away from a seating surface 354 at the junction of the inlet passage 350 and lower end of the valve chamber 356. The valve stem 380 is supported for sliding movement to control fluid flow between the inlet passage 350 and valve chamber 356 by means of a valve bonnet 370 which can be detached from the valve body 324 as in the valve 10 of the prior embodiment. For this purpose, the valve body 324 includes a flange 322 at the upper end of the valve chamber 356 and the valve bonnet 370 includes a matching lower end flange 322. These flanges 322 face and abut one another and secured in between the flanges 322 is a peripheral edge portion 388a of a flexible diaphragm 388.

As in the previously described valve 10, a central segment of the flexible valve diaphragm 388 is positively secured to the contoured surface of valve plug 382 so that precise valve flow characteristics are provided as previously described. A quick disconnect clamping ring assembly 330 is provided to hold the flanges 322 tightly against the diaphragm 388 and positively secure the valve body 324 and the valve bonnet 370 together in operational relation as shown.

The valve actuator 312 and the angle valve 310 are secured in coaxial alignment on the stem axis 358 by a connector 390 having a circular base 398 at the lower end joined to a pair of legs 394 and 396 on opposite sides of the stem axis and joined to an upper end plate 392. The end plate 392 is secured to the underside of a circular bottom wall 444 of a housing 432 of the actuator 312.

The housing 432 is substantially identical in construction and operation to the housing 132 and includes a lower spring chamber 460 holding a plurality of coil springs 474 exerting upward bias on a piston 466. A flexible diaphragm 464 above the piston 466 separates the spring chamber 460 from a control fluid chamber 462 between the diaphragm and a circular wall 470 which forms a bottom wall of an upper control chamber 472 in the housing 432. The control chamber 472 contains an electro-fluidic positioner 476 which supplies fluid at a controlled pressure to the control chamber 462 acting on the diaphragm 464 to move a stem assembly 510 interconnected between the piston 466 and the upper end of the valve stem 380. A quick-disconnect 512 is provided to detachably connect the lower end of the stem assembly 510 and the upper end of the valve stem 380.

The stem assembly 510 is designed to protect the valve plug 382, the diaphragm 388 and other components against excessive loads which might cause damage thereto. The stem assembly 510 includes an upper actuator connecting rod 510A and a lower actuating stem 510B interconnected together by a lost motion mechanism including a coil spring 511 having a spring constant selected so as to limit the amount of force between the upper rod 510A and lower stem 510B.

As best shown in FIG. 10, the lower actuating stem 510B includes a radial flange portion 513 of enlarged diameter having a frustoconical upper surface 513A that is grooved to contain an "O" ring 515 adapted to seat against a matching surface 450A in a central bore 450 of the top plate 392 when the valve 310 is fully open as shown in FIGS. 9 and 10. The "O" ring 515 seals off the bore 150 around the lower actuating stem 510B when the valve 310 is fully open and prevents entry of exterior contaminants into the spring chamber 460. During normal operation when the valve 310 is partially open or fully closed, the sealing "O" ring 515 moves down out of sealing engagement with the lower end surface 450A of the central bore 450. The lower actuating stem 510B is constructed with a hollow sleeve 517 open at the upper end and the sleeve projects upwardly of the flange 513 for a distance sufficient to house the spring 511 in the interior thereof. The sleeve 517 has an outer diameter less than the diameter of the bore 450 in the upper end plate 392 permitting air to flow into and out of the spring chamber 460 which is maintained at atmospheric pressure whenever the valve 310 is not in the fully open position.

The circular bottom wall 444 has a coaxial central bore 446 with a diameter dimensioned to permit a close sliding fit with the outer surface of the sleeve 517. A passage 444A extending between the upper and lower faces of the wall 444 permits the flow of air between the spring chamber 460 and a space 519 between the wall 444 and end plate 392, and the space 519 is in communication with the upper end of the bore 450 to permit air flow around the sleeve 517 between the atmosphere and spring chamber 460 whenever the "O" ring seal 515 is downwardly away from the bore seat 450A.

At the lower end, the upper actuator rod 510A is provided with a piston-like flange 519 slidably disposed in the interior of the sleeve 517 and positively retained in the sleeve by a retainer ring 521. As the actuator rod 510A begins a downstroke from the position shown in FIGS. 9 and 10, the lower end face of the piston 519 bears against the upper convolution of the spring 511 and if little or no opposing force is encountered, the stem members 510A and 510B move in unison with very little compression of the spring 511.

When the valve 310 reaches a closed position wherein the diaphragm 388 begins to contact the seat 354, the spring 511 may absorb the shocking forces during the closing or full seating of the valve plug while momentum of the actuating rod 510A is still in a downward direction.

The upper actuating rod 510A is secured to the piston 466 and diaphragm 464 by a nut 468 and an "O" ring 469 and seal washer 471 insure a tight connection and good seal between an upwardly projecting, position indicating stem 473 which provides position feed back information to the electropneumatic positioning device 476 housed in the chamber 472.

The stem assembly 510 includes a downtravel positive, position stop 525 in the form of a hollow sleeve secured to the upper actuator rod 510A by a retaining ring 527 at the lower end. The upper actuator rod 510A is formed with a flange 529 adjacent the piston 466 with a lock washer 531 interposed therebetween. The outer edge of the flange 529 maintains the upper end of the stop sleeve 525 in precise coaxial alignment. The stop sleeve 525 includes a radial lower end face 525A adapted to positively engage and stop against an upper surface 444B on the wall 444 when the end of a downstroke has reached a limit.

From the foregoing, it will be seen that the overload limiting stem assembly 510 protects components of the valve 310 from excessive forces which may be encountered in the field because of fluid pressure surges, electrical surges and the like. Moreover, the valve 310 provides for a directional change between the incoming and outgoing fluid of 90°, however, it should be understood that directional changes of greater and lesser magnitudes are possible without departure from the teaching and scope of the present invention.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A self draining sanitary control valve, comprising:
   a body having inlet means and outlet means with fluid control port means forming a valve seat therebetween;
   a bonnet detachably securable to said body having a stem receiving bore aligned on a common central axis with said port means;
   clamping ring means for securably clamping said body and said bonnet together when said ring means is engaged therewith in a locked position and movable to an unlocked position for permitting separation of said body and bonnet for cleaning; and
   valve means including a valve stem slidably mounted in said bore having a valve plug at one end having a predetermined outer surface profile movable toward and away from said port means and flexible diaphragm means having a central portion adjacent to said plug for engaging said seat and an outer peripheral portion clamped between said body and said bonnet when said clamping ring means is locked, said central portion of said flexible diaphragm permanently and adhesively secured to said profiled outer surface of said valve plug and having a substantially uniform thickness for providing a precisely matching profile substantially identical to the profile of said valve plug for cooperation with said valve seat resulting in a flow characteristic determined by said profile of said valve plug rather than said diaphragm alone.

2. The self-draining sanitary control valve of claim 1, wherein:
   said valve body includes an upper chamber having a wall sloping upwardly and outwardly of said valve seat toward an upper rim, said bonnet having a wall sloping downwardly and outwardly of said bore toward a lower rim; and
   wherein said outer peripheral portion of said flexible diaphragm is clamped between said upper and lower rims by said clamping ring means.

3. The self-draining sanitary control valve of claim 1, wherein:
   said inlet and outlet means, said fluid control port means and valve seat have highly polished cleanable metal surfaces and said flexible diaphragm has a smooth, readily cleanable surface cooperative with said valve seat for controlling flow therebetween.

4. The self-draining sanitary control valve of claim 2, wherein:
   said inlet means of said valve body includes an inlet passage having an inner end in communication with a lower end of said valve seat and an outer end terminating at an inlet port on said body; and
   wherein said inlet passage has a lower surface sloping from said valve seat toward said inlet port.

5. The self-draining sanitary control valve of claim 4, wherein:
   said outlet means of said valve body includes an outlet passage having an inner end in communication with said wall of said upper chamber and an outer end terminating at an outlet portion on said body; and
   wherein said outlet passage has a lower surface extending downwardly from said upper chamber to said outlet port.

6. The self-draining sanitary control valve of claim 5, wherein:
   said valve body includes a radial flange around said inlet port and said outlet port having an annular clamping surface thereon for engagement with clamping ring means for detachably securing said valve body in a fluid conduit.

7. The self-draining sanitary control valve of claim 1, including:
   valve actuator means connectable with said valve stem outside said bonnet for moving said stem on said central axis to move said valve plug toward and away from said valve seat for controlling fluid flow through said port means between said inlet and outlet means.

8. The self-draining sanitary control valve of claim 7, including:
   quick disconnect means for connecting and disconnecting said actuator means and said valve stem.

9. The self-draining sanitary control valve of claim 7, wherein:
   said actuator means include support means having a recess in coaxial alignment with said common axis and said bonnet includes a stem supporting boss around said bore dimensioned to seat in said recess for aligning said actuator means and said valve bonnet; and
   fastener means for securing said boss in said recess and releasable for permitting said bonnet to be separated from said actuator.

10. The self-draining sanitary control valve of claim 7, including:
    position indicator means on said actuator means for displaying the portion of said valve plug relative to said valve seat while said actuator means is connected with said valve bonnet and said valve stem.

11. A self-draining sanitary control valve, comprising:
    a body having inlet means and outlet means with fluid control port means forming a valve seat therebetween;
    a bonnet detachably securable to said body having a stem receiving bore aligned on a common central axis with said port means;
    clamping ring means for securably clamping said body and said bonnet together when said ring means is engaged therewith in a locked position and movable to an unlocked position for permitting separation of said body and bonnet for cleaning;
    valve means including a valve stem slidably mounted in said bore having a valve plug at one end movable toward and away from said port means and flexible diaphragm means having a central portion adjacent said plug for engaging said seat and an outer peripheral portion clamped between said body and said bonnet when said clamping ring means is locked;
    actuator means detachably securable to said bonnet and including a movable operator detachably connected with said stem for moving said valve plug to control flow between said inlet and outlet means through said port means;
    said actuator means including yoke means having a recess for receiving an upper portion of said bonnet around said valve stem for maintaining coaxial alignment between said valve stem and said movable operator;
    means for securing said upper portion of said bonnet in said recess;
    said yoke means including an open space around said valve stem and said operator, and including;
    quick disconnect means accessible in said open space for connecting and disconnecting said operator and said valve stem.

12. The self-draining sanitary control valve of claim 11, including:
    quick disconnect means outside said valve body between said stem and said operator for connecting and disconnecting the same for permitting said valve body to be detached from said actuator means for cleaning.

13. A self-draining sanitary control valve comprising:
    a body having inlet means and outlet means with fluid control port means forming a valve seat therebetween;
    a bonnet detachably securable to said body having a stem receiving bore aligned on a common central axis with said port means;
    clamping ring means for securably clamping said body and said bonnet together when said ring means is engaged therewith in a locked position and movable to an unlocked position for permitting separation of said body and bonnet for cleaning;
    valve means including a valve stem slidably mounted in said bore having a valve plug at one end movable toward and away from said port means and flexible diaphragm means having a central portion adjacent said plug for engaging said seat and an outer peripheral portion clamped between said body and said bonnet when said clamping ring means is locked;
    actuator means detachably securable to said bonnet and including a movable operator detachably connected with said stem for moving said valve plug to control flow between said inlet and outlet means through said port means;
    said actuator means including yoke means having a recess for receiving an upper portion of said bonnet around said valve stem for maintaining coaxial alignment between said valve stem and said movable operator;
    means for securing said upper portion of said bonnet in said recess;
    said actuator means including an actuation chamber having a bore coaxially aligned with said bore in said bonnet for slidably receiving said operator for longitudinal movement along said common axis; and
    seal means around said bore of said actuation chamber and said operator for sealing the interior of said chamber when said valve stem is disconnected from said operator and said operator is seated in a retracted position relative to said chamber.

14. The self-draining sanitary control valve of claim 13, including:
    means in said actuation chamber for biasing said operator toward said retracted position.

15. The self-draining sanitary control valve of claim 13, wherein:
    said seal means includes self-draining matching surfaces around said bore of said chamber and said operator sloped downwardly and outwardly around said bore of said chamber.

16. In combination, a self draining sanitary control valve, comprising:
    a body having inlet means and outlet means with a valve seat formed therebetween;
    a bonnet detachably securable to said body having a stem receiving bore aligned on a common central axis with said valve seat;
    valve means including a valve stem slidably mounted in said bore having a valve plug at one end having a predetermined outer surface profile movable toward and away from said valve seat; and
    actuator means including an operator detachably connected with said stem for moving said valve plug to control flow between said inlet and outlet means through said valve seat, said actuator means including a housing and support means for detachably interconnecting said bonnet and said housing, piston means in said housing for reciprocally moving said operator inwardly and outwardly of said housing along said common central axis while said operator is connected to said valve stem,
means for biasing said operator toward an inwardly retracted position;
and means for forming a seal between said operator and said housing to prevent the entry of contaminants into said housing from the exterior thereof when said operator is retracted inwardly and for venting said housing when said operator is extended outwardly.

17. The combination of claim 16, including:
a position indicator movable with said operator adjacent said support means externally of said housing for indicating the position of said valve plug.

18. In combination a self draining sanitary control valve, comprising:
a body having inlet means and outlet means with a valve seat formed therebetween;
a bonnet detachably securable to said body having a stem receiving bore aligned on a common central axis with said valve seat;
valve means including a valve stem slidably mounted in said bore having a valve plug at one end having a predetermined outer surface profile movable toward and away from said valve seat;
actuator means connected including an operator detachably connected with said stem for moving said valve plug to control flow between said inlet and outlet means through said valve seat, said actuator means including a housing and support means for detachably interconnecting said bonnet and said housing, piston means in said housing for reciprocally moving said operator inwardly and outwardly of said housing along said common central axis while said operator is connected to said valve stem, and means for biasing said operator toward an inwardly retracted position, forming a seal between said operator and said housing to prevent the entry of contaminants into said housing from the exterior thereof;
said housing including a fluid chamber enclosing said piston means for movement between upper and lower walls thereof, said lower wall having an external port aligned with said common central axis for slidably receiving said operator, said port dimensioned to guide said operator during slidable movement along said central axis and permit said chamber to breathe beneath said piston means when said operator is positioned downwardly of said inwardly retracted sealing position.

19. The combination of claim 18, wherein:
said port is formed with an outwardly extending annular stop surface adjacent an outwardly facing side of said lower chamber wall and said operator includes a matching surface for moving toward sealed stopping engagement with said stop surface when said operator is in said inwardly retracted sealing position.

20. The combination of claim 19, including:
resilient annular seal means on said stop surface for sealingly engaging said matching surface of said operator.

21. The combination of claim 18, wherein:
said housing includes a control chamber spaced above said fluid chamber for containing electro-fluidic positioner means, said control chamber and said fluid chamber being sealed from one another by said upper wall nd a passage in said upper wall for permitting a flow of fluid into and out of a portion of said fluid chamber above said piston means for moving the same in response to the output of fluid controlled by said electro-fluidic positioner means.

22. The combination of claim 21, including:
a position indicator connected to move with said piston means and extended through said upper wall into said control chamber for engaging limit switch means for controlling said electro-fluidic positioner means in response to the position of said valve plug.

23. The combination of claim 21, including:
port means in said control chamber for supplying and exhausting fluid used by said electro-fluidic positioner means for controlling movement of said piston means.

24. The combination of claim 21, wherein:
said control chamber includes:
a generally cylindrical side wall closed at a lower end by said upper wall of said fluid chamber, said upper wall of said fluid chamber being detachably secured to said side wall below a lower end thereof; and
a top wall detachably secured to said side wall and closing said control chamber above said fluid chamber for enclosing said electro-fluidic positioner means.

25. The combination of claim 24, wherein:
said top wall has a sloped upper surface and said body side wall has an annular flange at an upper end secured under a peripheral edge of said top wall.

26. The combination of claim 25, including:
at least one upwardly directed threaded fastener having a headed lower end below said peripheral edge for securing said top wall onto said body.

27. The combination of claim 24, including:
at least one upwardly directed threaded fastener having a headed lower end below said body for securing said bottom wall of said fluid chamber below said body.

28. The combination of claim 24, wherein:
said top wall, said cylindrical body and said lower wall of said fluid chamber having maximum outer diameter dimensions of substantially the same value.

29. A self draining sanitary control valve, comprising:
a body having inlet means and outlet means with fluid control port means forming a valve seat therebetween;
a bonnet detachably securable to said body having a stem receiving bore aligned on a common central axis with said port means;
clamping ring means for securably clamping said body and said bonnet together when said ring means is engaged therewith in a locked position and movable to an unlocked position for permitting separation of said body and bonnet for cleaning;
valve means including a valve stem slidably mounted in said bore having a valve plug at one end having a predetermined outer surface profile movable toward and away from said port means and flexible diaphragm means having a central portion adjacent to said plug for engaging said seat and an outer peripheral portion clamped between said body and said bonnet when said clamping ring means is locked, said central portion of said flexible diaphragm permanently secured to said profiled outer surface of said valve plug for providing a matching profile similar to said valve plug for cooperation with said valve seat resulting in a flow characteristic determined by said profile of said valve plug rather than said diaphragm alone;

said valve body including an upper chamber having a wall sloping upwardly and outwardly of said valve seat toward an upper rim, said bonnet having a wall sloping downwardly and outwardly of said bore toward a lower rim, said outer peripheral portion of said flexible diaphragm being clamped between said upper and lower rims by said clamping ring means;

said inlet means of said valve body including an inlet passage having an inner end in communication with a lower end of said valve seat and an outer end terminating at an inlet port on said body; and wherein said inlet passage has a lower surface sloping from said valve seat toward said inlet port.

30. The self-draining sanitary control valve of claim 29, wherein:

said outlet means of said valve body includes an outlet passage having an inner end in communication with said wall of said upper chamber and an outer end terminating at an outlet portion on said body; and wherein said outlet passage has a lower surface extending downwardly from said upper chamber to said outlet port.

31. The self-draining sanitary control valve of claim 30, wherein:

said valve body includes a radial flange around said inlet port and said outlet port having an annular clamping surface thereon for engagement with clamping ring means for detachably securing said valve body in a fluid conduit.

* * * * *